United States Patent
Bontempi et al.

(10) Patent No.: US 11,556,621 B2
(45) Date of Patent: Jan. 17, 2023

(54) ENCODING A KEY TOUCH ON A DEVICE

(71) Applicant: INTERNATIONAL BUSINESS MACHINES CORPORATION, Armonk, NY (US)

(72) Inventors: Valerio Bontempi, Rome (IT); Crescenzo Migliaccio, Naples (IT); Simone Rutigliano, Terlizzi (IT); Gianluca Carugno, Rome (IT); Antonio Di Cocco, Rome (IT); Umberto Manganiello, Manocalzati (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 381 days.

(21) Appl. No.: 16/283,956

(22) Filed: Feb. 25, 2019

(65) Prior Publication Data
US 2020/0272711 A1 Aug. 27, 2020

(51) Int. Cl.
*G06F 21/31* (2013.01)
*G06F 3/023* (2006.01)
*G06F 3/042* (2006.01)
*H04L 9/32* (2006.01)

(52) U.S. Cl.
CPC .............. *G06F 21/31* (2013.01); *G06F 3/023* (2013.01); *G06F 3/0426* (2013.01); *H04L 9/3226* (2013.01)

(58) Field of Classification Search
CPC ........ G06F 21/31; G06F 3/023; G06F 3/0426; G06F 3/04886; H04L 9/3226
See application file for complete search history.

(56) References Cited

U.S. PATENT DOCUMENTS

| 8,176,324 B1 | 5/2012 | Krishnamurthy |
| 9,038,166 B2 | 5/2015 | Yi et al. |
| 9,746,938 B2 | 8/2017 | Gardner et al. |
| (Continued) | | |

FOREIGN PATENT DOCUMENTS

| CN | 101499907 A | 8/2009 |
| KR | 101085490 B1 | 11/2011 |

OTHER PUBLICATIONS

Disclosed Anonymously, "A method for preventing the disclosure of passwords through "shoulder-surfing" and keylogging", IP.com No. IPCOM000205282D, Electronic Publication Date: Mar. 24, 2011, 3 pages.

*Primary Examiner* — Kenneth Bukowski
(74) *Attorney, Agent, or Firm* — Caleb D. Wilkes

(57) ABSTRACT

A method, system, and computer program product for encoding a key touch on a device. The method may include detecting a key touch at one of two of more subareas of a key area and encoding the detected key touch into one code of a plurality of codes. Each code may be associated with one key area and one subarea of the key area. The method may perform an operation to determine whether to authorize access to a resource by determining whether the code, at least in part, authorizes the access. The key area may be marked with an indicia. The two or more subareas of the key area may be unmarked and may be of equal size. The key area may be divided into the two or more subareas by specifying two or more subregions of sensor pixels of a region of sensor pixels of a touch-sensitive screen.

20 Claims, 5 Drawing Sheets

(56) References Cited

U.S. PATENT DOCUMENTS

| | | | |
|---|---|---|---|
| 2012/0126941 A1* | 5/2012 | Coggill | G06F 3/04886 340/5.54 |
| 2012/0240069 A1* | 9/2012 | Kawalkar | G06F 3/04886 715/767 |
| 2014/0101593 A1* | 4/2014 | Paek | G06F 3/04883 715/773 |
| 2016/0170497 A1* | 6/2016 | Gardner | H04L 63/083 345/168 |
| 2017/0302648 A1* | 10/2017 | Ferrydiansyah | G06F 21/36 |
| 2020/0150782 A1* | 5/2020 | Gupta | G06F 3/012 |
| 2021/0192091 A1* | 6/2021 | Clark | G06F 3/0238 |

* cited by examiner

ENCODING A KEY TOUCH ON A DEVICE

FIELD

Embodiments of the present invention relate to a method, system, and computer program for secure use of keypad or key board, and more specifically to encoding a key touch on a device.

BACKGROUND

Information, such as passwords or pins, are important to a user or a business. For example, passwords or pins may be needed to access different accounts, such as a bank account or an email account. It is generally important for such information to be protected from unauthorized appropriation and subsequent misuse.

SUMMARY

An embodiment of the present invention may include a method, system, and computer program product for encoding a key touch on a device. The method may include detecting a key touch at one of two of more subareas of a key area. The method may include encoding the detected key touch into one code of a plurality of codes. Each code may be associated with one key area and one subarea of the key area. The method may perform an operation to determine whether to authorize access to a resource by determining whether the code, at least in part, authorizes the access. The operation may also include transmitting the code to a server remote form a device. The key area may be marked with an indicia. The two or more subareas of the key area may be unmarked and may be of equal size. The two or more subareas of the key area may include four subareas. The key area may be divided into the two or more subareas by specifying two or more subregions of sensor pixels of a region of sensor pixels of a touch-sensitive screen. The sensor pixels may be resistive or capacitive sensor pixels.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
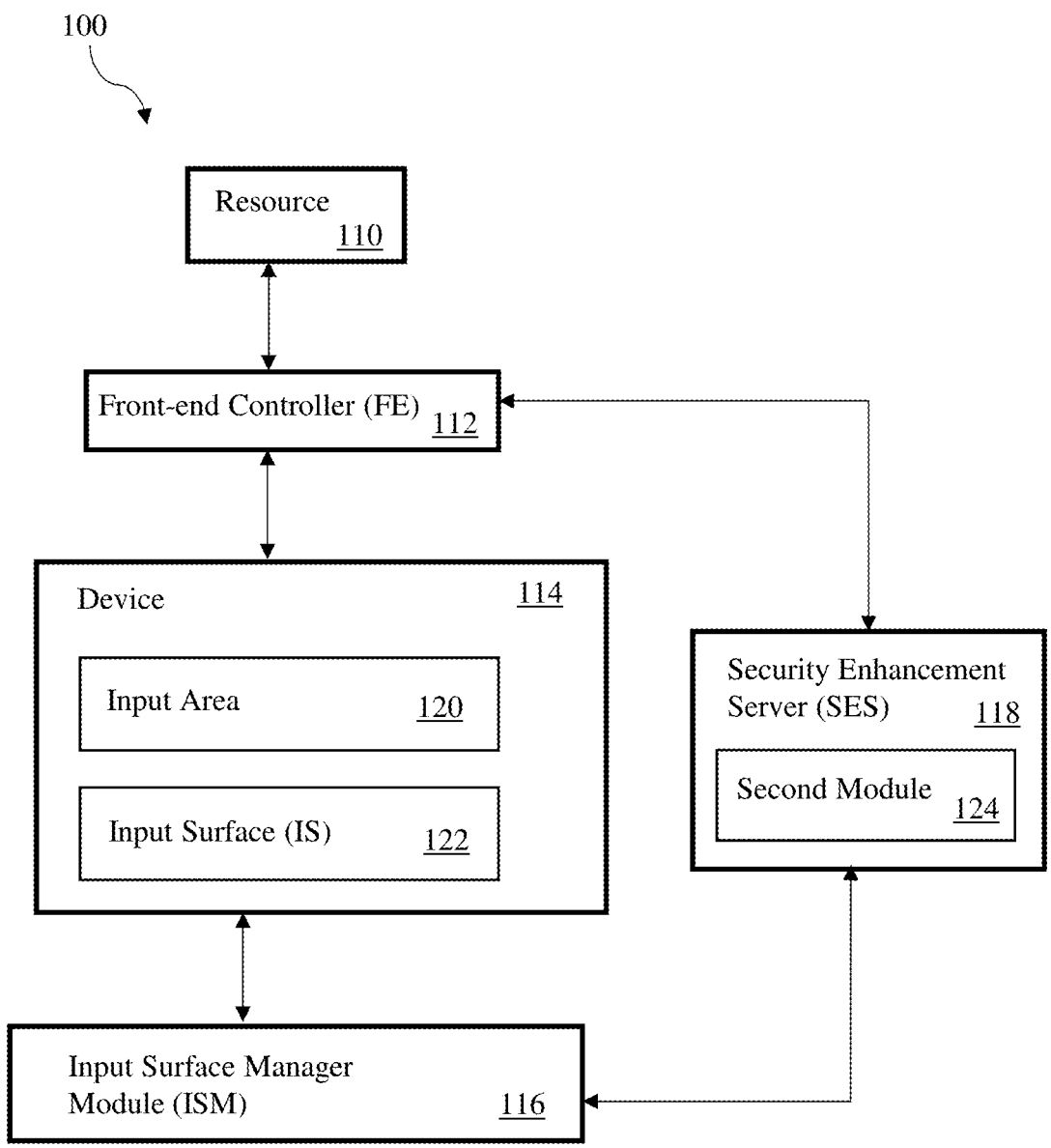
FIG. 1 is a schematic block diagram illustrating a system for encoding a key touch on a device, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to a method, system, and computer program for encoding a key touch on a device. More particularly, embodiments of the present invention relate to a method, system, and computer program for encoding a received key touch on a device to protect a user's information from being misappropriated by others engaged in the act of shoulder surfing.

Shoulder surfing refers to the act of obtaining personal or private information of a user through direct observation. It involves looking over the user's shoulder to gather pertinent information about the user, while the user is oblivious to the breach. Shoulder surfing may be especially effective in crowded places where the user is using a computer, a smartphone, an ATM, or any other communication device. In crowded situations, the user may be less likely to figure out that others around the user may be shoulder surfing to gather information that may be important to the user. In less crowded situations, the act of shoulder surfing may become more apparent to the user. However, even in less crowded situations, other means, such as binoculars, video cameras, or vision-enhancing devices, may be used to gather the user's important information. As such, there exists a need to allow for the user to quickly and efficiently type in the user's important information, such as a password or a pin, without allowing an unauthorized appropriation of that important information.

Accordingly, at least some of the embodiments described herein provide a technical solution to the problems described above with respect to protecting the user's important information. Specifically, some embodiments described herein provide a method, system, and computer program for encoding a key touch on a device.

Reference will now be made in detail to the embodiments of the present invention, examples of which are illustrated in the accompanying drawings, wherein like reference numerals refer to like elements throughout. Embodiments of the invention are generally directed to encoding a key touch into a code on a device.

FIG. 1 illustrates a system 100 for encoding a key touch on a device, in accordance with an embodiment of the invention. The system 100 may include a resource 110, a front-end controller 112, a device 114, an input surface manager module 116, and a security enhancement server 118. The resource 110 may be any type of information that the device 114 may allow the user to get access to. For example, the resource 110 may be, but is not limited to, an email account, a social media account, a banking account, or a security account.

The front-end controller 112 may be a user interface that the user may interact with. It shows the input fields where the user can enter a password. The front-end controller 112 may present input fields of an online application, such as a social media application, a banking application, or an email application. The front-end controller 112 may also present input fields of an ATM login screen or a secure door access panel. The front-end controller 112 may communicate with the device 114, the security enhancement server 118 and the resource 110 through wired, wireless, or fiber optic connections.

The device 114 may include an input area 120 and an input surface 122. In an example embodiment, the device 114 may be a desktop computer, a notebook, a laptop computer, a tablet computer, a thin client, a mobile terminal, such as a smartphone, an ATM, or any programmable electronic device supporting the functionality required by one or more embodiments of the invention. The input area 120 may be the area where the user inputs the user's credentials. For example, the input area 120 may be the area associated with the user's login name and password when the user is attempting to login to the user's email account. The input surface 122 may be the surface that the user may use to input the user's credentials into the input area 120. The input surface 122 may include a plurality of key areas (illustrated in FIG. 2). The input surface 122 may be configured to different security levels, such as, but not limited to, basic level security, mid-level security, or high-level security (illustrated in FIG. 3). The input surface 122 is described in more detail with reference to FIG. 2.

The input surface manager module 116 may manage the input surface 122 and may be an example of a first module. The input surface manager module 116 may communicate with the input surface 122 of the device 114 in order to configure the input surface 122 according to a security level chosen by the user. In an example embodiment, the input surface manager module 116 receives from a sensing mechanism of the input surface 122 information corresponding to a detection of the user's key touch. The input surface manager module 116 may treat the received information as a code corresponding with the detected key touch and encode the detected key touch into a code. The code may be a numeric number or a special character sequence that may be associated with the key area touched by the user.

The input surface manager module 116 may also communicate with a second module 124, located on the security enhancement server 118, to determine whether the credentials entered by the user, at least in part match the information stored with the security enhancement server 118, thus allowing the user access to the resource 110. The security enhancement server 118 (and second module 124) may be integrated with the device 114 or included in an apparatus in which one or more of the device 114, the input surface manager module 116, and the front-end controller 112 are in close proximity. Alternatively, the security enhancement server 118 may be remote from the device 114. For example, the SES 118 may be located at a cloud computing location and accessed via a network, such as the internet.

Figure 2A:
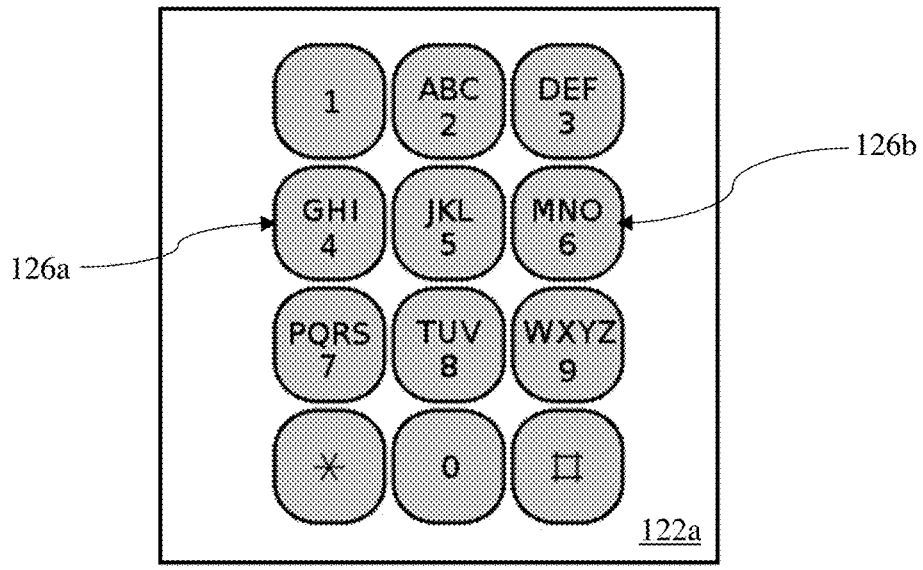
FIG. 2A is a plan view illustrating an example input surface, in accordance with an embodiment of the invention.
Figure 2B:
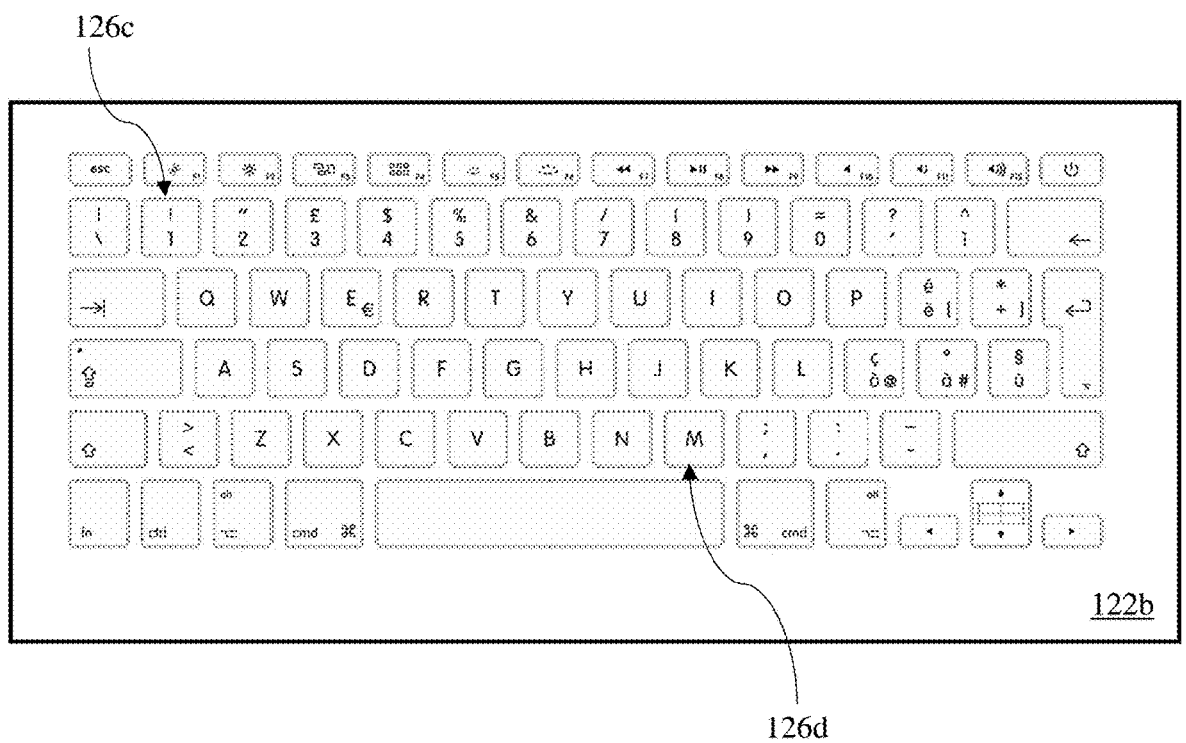
FIG. 2B is a plan view illustrating an example input surface, in accordance with an embodiment of the invention.

FIGS. 2A and 2B illustrate example input surfaces 122a and 122b that may be used to input information, for example login information, in accordance with an embodiment of the present invention. The input surface 122 may be a numeric keypad, as is illustrated in FIG. 2A, or a keyboard, as illustrated in FIG. 2B. The input surface 122 may be a touch-sensitive screen keypad or a keyboard. The sensing mechanism may be a resistive sensing mechanism, a capacitive sensing mechanism, or a mechanical sensing mechanism. The input surface 122 may also be a conventional or mechanical keypad or keyboard that employs physical keys and conventional non-touch screen key actuation mechanisms, such as mechanical or electrical switches.

The input surface 122 may include a plurality of key areas 126. Each key area 126 may have an indicia of one or more characters of a plurality of characters, such as a letter of the alphabet, a number, a punctuation, or any other character that may be integrated into the input surface 122. For example, as is illustrated in FIG. 2A, key area 126a has an indicia of the number 4 as well as letters G, H, and I. Key area 126b has an indicia of the number 6 as well as letters M, N, and O. In addition, as is illustrated in FIG. 2B, key area 126c has an indicia of the number 1 and the punctuation mark "!" whereas key area 126d has an indicia of the letter M.

In an example embodiment, the input surface may be a touch-sensitive screen keyboard or keypad where each key area 126 of the input surface 122 may include a region of sensor pixels (not illustrated in the Figures). The sensor pixels may be dispersed substantially throughout the whole key area 126 of each key area 126 of the input surface 122. For example, the sensor pixels may be arranged in a matrix or grid. The sensor pixels may be resistive sensor pixels, capacitive sensor pixels, or pixels of any other suitable technology. In an alternative embodiment, the input surface 122 may be a conventional or mechanical keypad or keyboard where the desired key area 126 may have to be depressed to be selected. Each key area 126 of the mechanical input surface 122 may have at least one conventional switch or pressure sensor (not illustrated in the Figures).

Figure 3:
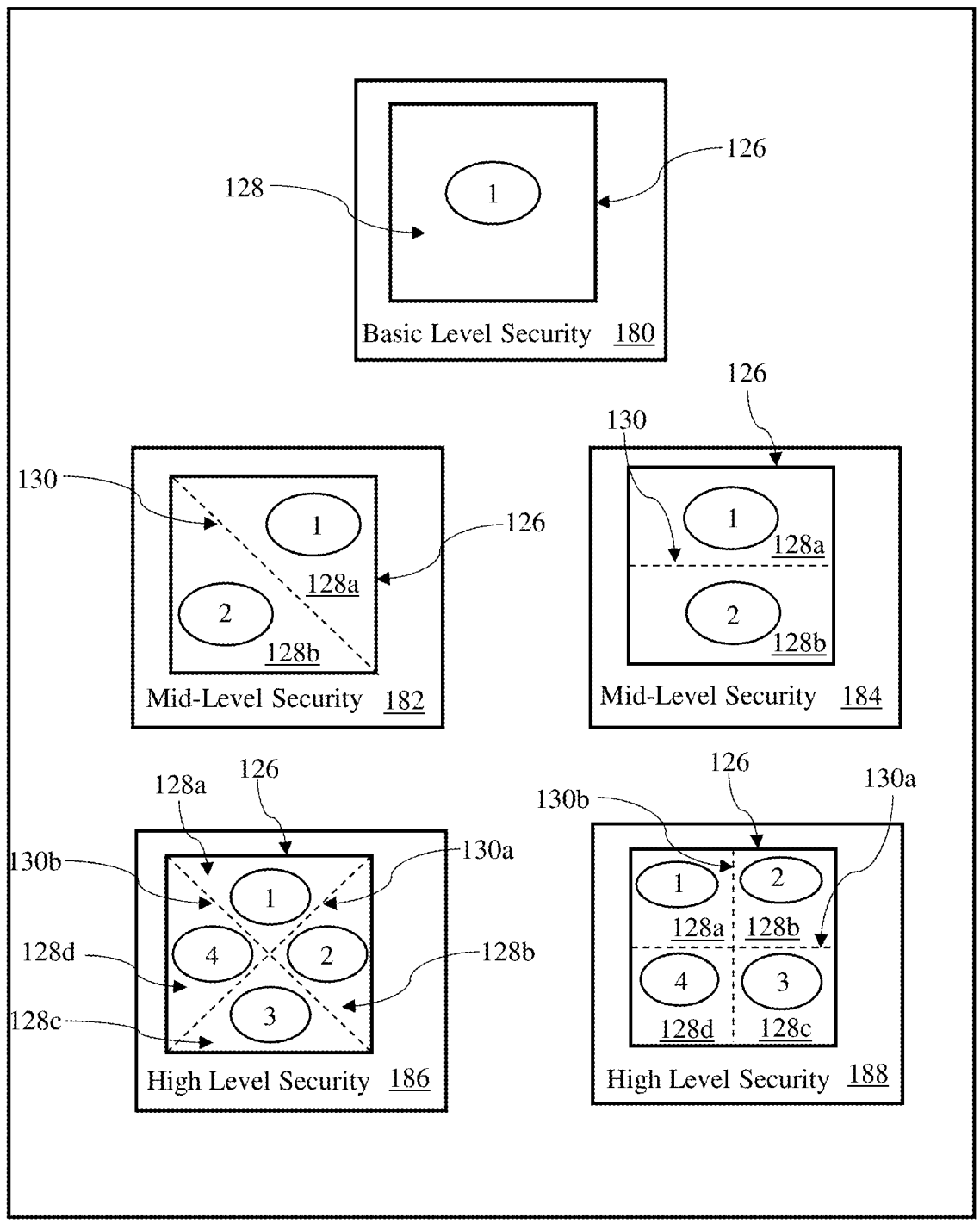
FIG. 3 is a schematic block diagram illustrating examples of key areas divided into hidden subareas, in accordance with an embodiment of the invention.

FIG. 3 is a schematic block diagram illustrating examples of key areas 126 divided into hidden subareas, in accordance with an embodiment of the invention. In a conventional input surface 122, the key areas 126 are not subdivided. Rather, each key area 126 may correspond with only one subarea 128, as is illustrated by block diagram 180. This provides the user basic level of security. As a result, when the user is typing in a password, such as "PASS", a person who is shoulder surfing may easily determine the user's password by observing the key areas 126 contacted, touched or depressed by the user. Once the password is determined, a person may then use it to obtain access to the user's personal information, for example a bank account.

However, blocks 182-188 of FIG. 3 illustrate key areas 126 divided into different subareas 128. Embodiments of the present invention allow each key area 126 of the input surface 122 to be divided into two or more subareas 128. The subareas 128, shown in the Figure by dashed lines 130, 130a, and 130b for purposes of illustration, are not visible on the surface of each of the key areas 126. In an embodiment of the invention, each subarea 128 may be unmarked with indicia (of the subarea) and may be of equal size. The subareas 128 may have different shapes, such as, but not limited to, square, rectangle, triangle, or pie. While each subarea 128 omits any marking designating the subarea, it should be understood that a subarea may include indicia of one or more characters of a plurality of characters, such as a letter of the alphabet or a number, such as shown in FIGS. 2A and 2B.

The number of subareas 128 per each key area 126 may determine the level of security. As is shown in blocks 182 and 184, mid-level security may refer to having each key area 126 subdivided into at least two subareas 128. High level security may refer to having each key area 126 subdivided into at least four subareas 128, as is illustrated in blocks 186 and 188. Referring to block 188, the key area 126 may be divided into four subareas 128a, 128b, 128c, and 128d. The dashed lines 130a and 130b illustrate how the division may occur. This type of subarea 128 division may be associated with high-level security. Alternative embodiments may provide even higher level of security. For example, each of the four subareas 128a, 128b, 128c, and 128d, may be further subdivided (not illustrated in the Figures) into at least two subareas each, providing even higher level of security.

Dividing the key area 126 into at least two or more subareas 128 may protect the user's important information from persons engaged in the act of shoulder surfing. As is described herein with reference to FIG. 1, the input surface manager module 116 may configure the input surface 122 to the level of security desired by the user. For example, the user may wish to have a high-level security when entering the user's email password. As such, the input surface manager module 116 may configure the input surface 122 by dividing each key area 126 into four subareas, as illustrated by blocks 186 and 188 of FIG. 3.

For example, the user may wish to access the user's banking account on the user's mobile terminal. The user's password to the banking account may be the word "PASS". The user may interact with the bank's application. During the log-in process, the user may be asked to type into the input area 120 the user's login and password using the input surface 122. In this example, the input surface 122 may be a touch sensitive screen where each key area 126 may be subdivided into two subareas 128, as illustrated by blocks 182 and 184 of FIG. 3. Each key area 126 of the input surface 122 may be configured by the input surface manager module 116 by specifying two subregions of sensor pixels of a region of sensor pixels. The region of sensor pixels may be associated with the sensor pixels dispersed throughout the whole region of the key area 126. With the configured input surface 122, the user may type in the password "PASS". A person shoulder surfing may see that the user typed the word PASS. However, that person may not see that the user touched different parts of the key area 126. For example, the user touched the top part of the key area 126 associated with the character "P", the bottom part of the key area 126 associated with character "A", the bottom part of the key area 126 associated with the character "S", and the top part of the key area 126 associated with the character "S". As a result, the input surface manager module 116 may receive four key touch pairs [P,1], [A,2], [S,2], [S,1], where each key touch pair may be associated with one key area 126 and one subarea 128 of that key area 126. The input surface manager module 116 may then code each of the four key touch pairs into a series of four different numbers, letters, characters, or combination of the three. Therefore, the person that may be shoulder surfing may be unable to determine what part of the key area 126, and subsequently what subarea 128, the user touched when inputting the password. Subsequently, when the person engaged in the act of shoulder surfing tries to login to the user's account by typing the password PASS, the person will be unable to gain access because the person did not know which parts of the key area 126 corresponding to each letter of the password to touch. As a result, the password entered by the unauthorized person may not match the password stored on the security enhancement server 118.

It should be appreciated that FIG. 3 illustrates some examples of how the key areas 126 may be divided into different number of subareas and possible ways to divide a key area 126 should not be construed to be limited to those shown in FIG. 3. Any suitable division of a key area 126 may be employed. Further, each key area 126 may be divided into the same number of subareas. For example, in an embodiment of the invention, each key area 126 may be subdivided into two subareas, as illustrated by block 182 or 184. In an alternative embodiment, some key areas 126 may be subdivided into two subareas per each key area 126, as illustrated by block 182 or 184, and some key areas 126 may be subdivided into four subareas per each key area 126, as illustrated by block 186 or 188. In yet another embodiment, only one key area 126 of two or more key areas 126 is be divided into subareas, the other key areas 126 remaining undivided into subareas.

Figure 4:
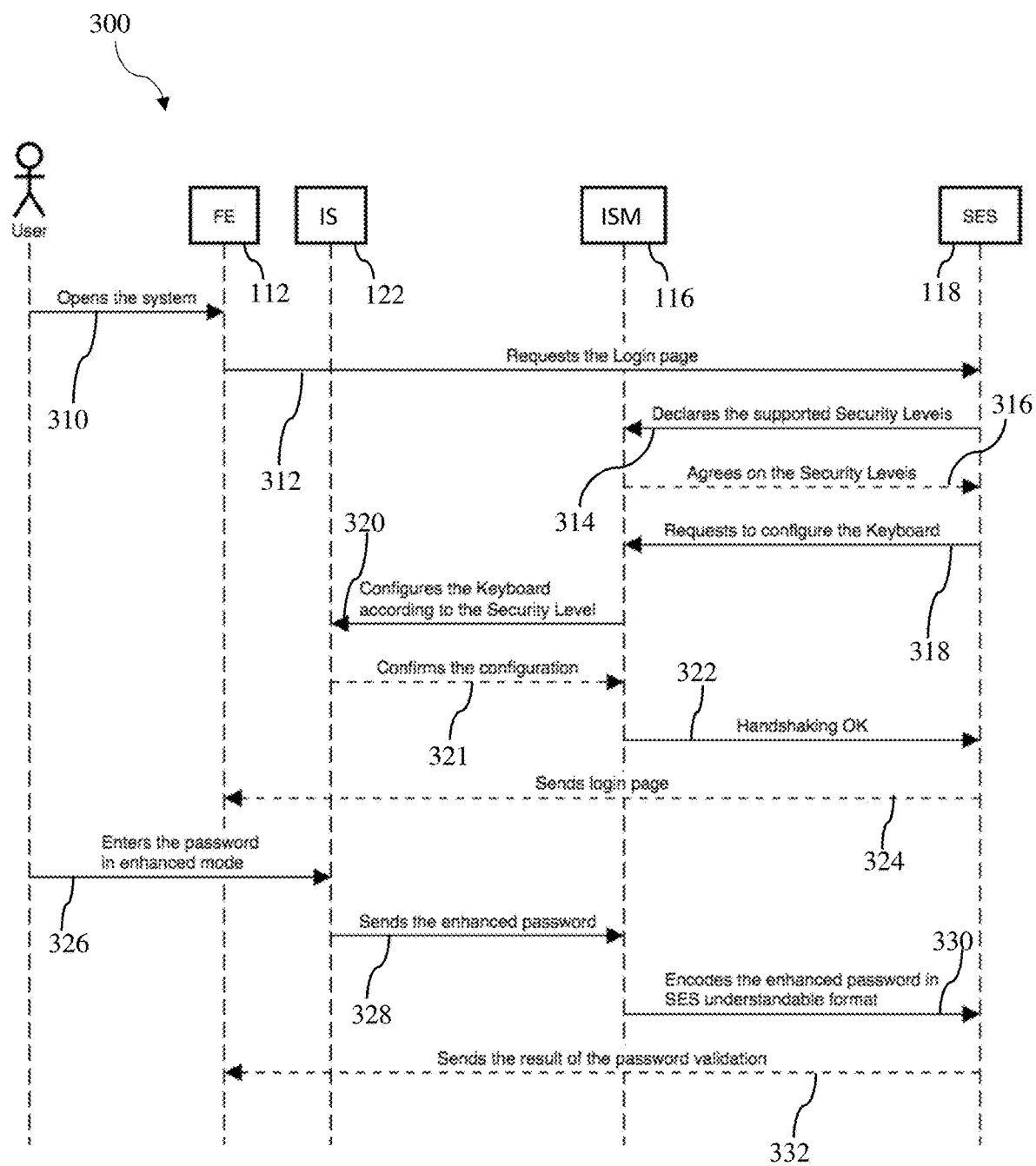
FIG. 4 is a flow chart illustrating an example method for encoding a key touch on a device, in accordance with another embodiment of the invention.

FIG. 4 illustrates a method 300 for using the system 100 to encode a key touch on a device. When the user opens the front-end controller 112, at operation 310, the front end controller 112 requests, at operation 312, from the security enhancement server 118, the login page to the resource 110 that the user may wish to log onto. Referring to operation 314, the security enhancement server 118 relays to the input surface manager module 116 the security levels that the security enhancement server 118 supports. The security level may be basic level security, mid-level security, or high level security as described herein with respect to FIG. 3. Referring to operation 316, the input surface manager module 116 confirms with the security enhancement server 118 the agreed upon security level that may be used.

Once the security enhancement server 118 and the input surface manager module 116 agree upon which security level may be used, the security enhancement server 118 requests, at operation 318, that the input surface manager module 116 configures the input surface 122 to the agreed upon security level. Referring to operation 320, the input surface manager module 116 configures the input surface 122 to the chosen security level. During the configuration process, the input surface manager module 116 may divide the key areas 126 of the input surface 122 to the unmarked subareas 128. For example, if the agreed upon security level is mid-security level, the input surface manager module 116 may divide the key areas 126 into two subareas 128, as illustrated by blocks 182 or 184 of FIG. 3. The input surface 122 confirms to the input surface manager module 116 that the input surface has been successfully configured in operation 321.

Once the input surface 122 is configured, the input surface manager module 116, at operation 322, sends to the security enhancement server 118 confirmation of the input surface's 122 configuration. Referring to operation 324, the security enhancement server 118 sends to the front end controller 112 the login page. The user, at operation 326, enters the password using the configured input surface 122.

Referring to operation 328, the input surface 122 sends the user's input to the input surface manager module 116.

When the input surface manager module 116 receives the user's input, the module 116 associates a code with the user's input. The code may be one code of a plurality of codes and may be associated with a number, a letter, a character, or a combination of all three. For example, if the user's password is PASS, the user, using the configured input surface 122, may have entered the password as [P,1], [A,2], [S,2], [S,1]. This password, entered in the enhanced mode, is then sent to the input surface manager module 116 for encoding. The input surface manager module 116 may take one key area 126 and one subarea 128 of the key area 126 and encode it with one code, e.g. [P,1]. This may be done with all key area 126 and subarea 128 of the key area 126 pairs, or with a select number of key area 126 and subarea 128 of the key area 126 pairs. The input surface manager module 116 may alternatively take the [P,1] for key area 126 and subarea 128 of the key area 126 pair and encode it with a character, such as #. The input surface manager module 116 may take the second pair [A,2] and encode it with a number, such as 5. The input surface manager module 116 may take the last two pairs [S,2], [S,1] and encode them with a letter Y and a character !, respectively. Therefore, in one embodiment, the encoded password may be "#5Y!." In another embodiment, the encoded password may be the following four codes: [P,1], [A,2], [S,2], [S,1]. The above encoding examples are not limiting and are described herein for illustration purposes only. The input surface manager module 116 may encode the key area 126 and subarea 128 of the key area 126 pair in any format that may be understandable by the security enhancement server 118.

Referring to operation 330, the input surface manager module 116 sends the encoded password to the second module 124 of the security enhancement server 118. Referring to operation 332, the second module 124 of the security enhancement server 118 checks the received encoded password with a stored password to determine whether to authorize access to the resource 110. In an embodiment, the password may be stored on the server 118. During the authorization process, the second module 124 may review the encoded password with the stored password to determine whether the encoded password at least in part matches the code password that is stored on the server 118 to authorize access. In an embodiment of the invention, the second module 124 may also determine whether the first code, associated with the user's first entry of the password on a configured input surface 122, matches a first code stored at the security enhancement server 118. If the encoded password matches the code password stored on the server 118, the user may be able to access the resource 110. If the encoded password does not match the code password stored on the server 118, the user may be denied access to the resource 110.

One embodiment of the invention is directed to a method for encoding a key touch on a device. The method may include detecting a key touch at one of two of more subareas 128 of a key area 126. The detected key touch may be encoded into one code of a plurality of codes. Each code may be associated with one key area 126 and one subarea 128 of the key area 126.

The method may also perform an operation to determine whether to authorize access to a resource. The operation may include determining whether the code, at least in part, authorizes the access. The method may have the key area 126 marked with an indicia. There may also be two or more subareas 128 of the key area 126 that are unmarked. The two or more subareas 128 of the key area 126 may be of equal size. The two or more subareas 128 of the key area 126 may include four subareas 128.

The method may further comprise dividing the key area 126 into two or more subareas 128 by specifying two or more subregions of sensor pixels of a region of sensor pixels of a touch-sensitive screen. The sensor pixels may be resistive or capacitive sensor pixels. The method may also include transmitting the code to a server 118 remote from the device 114.

Another embodiment of the invention is directed to a device for encoding received key contacts. The device may include two or more input surfaces 126 having indicia of one character of a plurality of characters. At least a first one of the input surfaces 126 may include two or more subareas 128 and may have indicia of a first character. The subareas 128 are not marked with an indicia. The subareas 128 may be rectangular or triangular.

The device may include a sensing mechanism that may be operable to detect a first contact that contacts a first one of the two or more subareas 128 of the first input surface 126. The first contact does not contact the other of the two or more subareas 128. The sensing mechanism may be a resistive sensing mechanism, a capacitive sensing mechanism, or a mechanical sensing mechanism.

The device may include a first module 116 to encode the detected first contact into a first code that associates the detected first contact with first character and the first subarea 128. The device may also include a second module 124 to determine whether the first code matches a first stored code. The first stored code may be one code of two or more stored codes corresponding with a string of codes used to authorize access to a resource.

Figure 5:
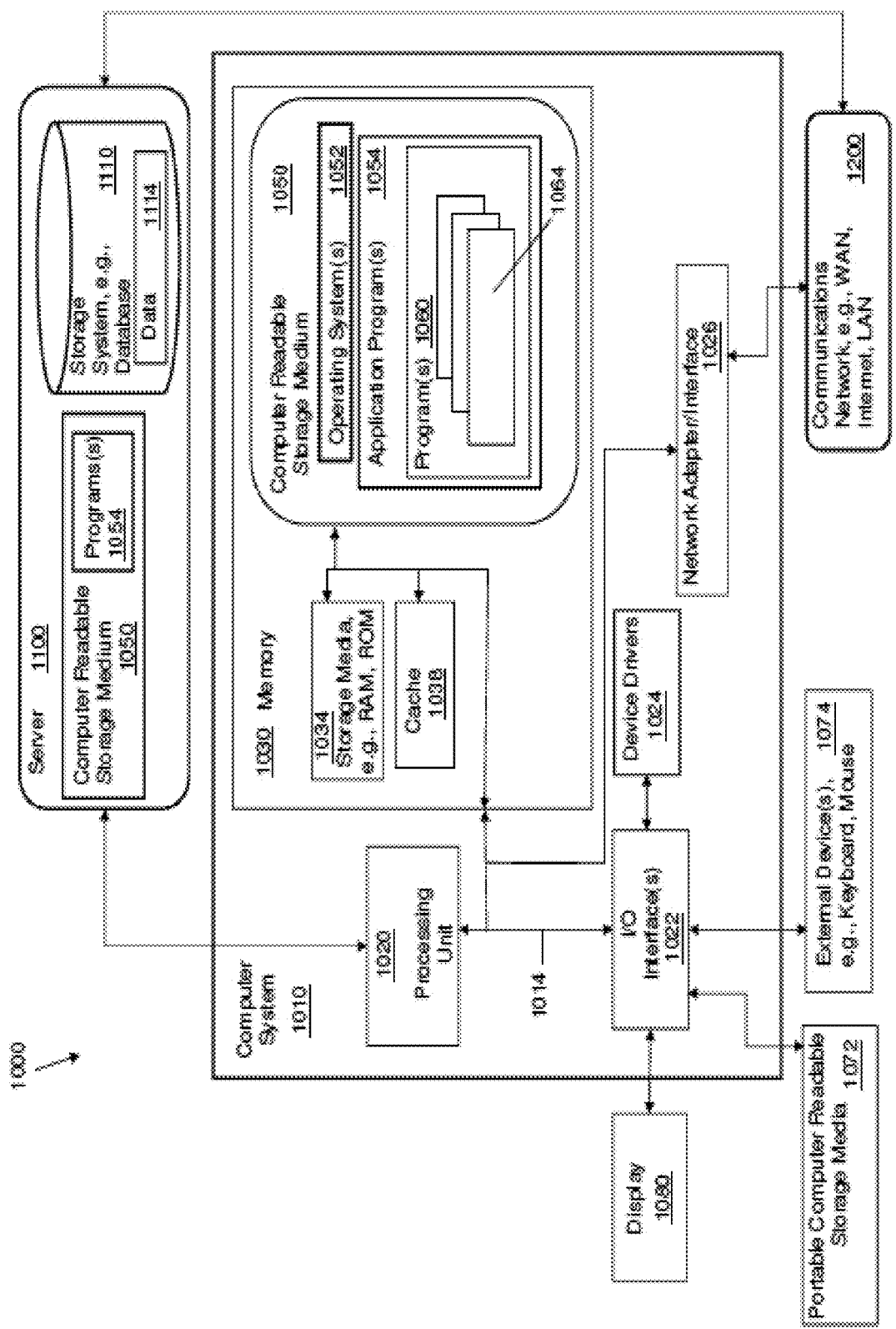
FIG. 5 is a block diagram depicting the hardware components of a system for encoding a key touch on a device, in accordance with an embodiment of the invention.

Referring to FIG. 5, a system 1000 includes a computer system or computer 1010 shown in the form of a generic computing device. The method 300, for example, may be embodied in a program(s) 1060 (FIG. 5) embodied on a computer readable storage device, for example, generally referred to as memory 1030 and more specifically, computer readable storage medium 1050 as shown in FIG. 5. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 5 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 5 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 5, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 300 (FIG. 4), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network.

The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed system and environments have been sequentially or serially identified suing numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for device security, the method comprising:
   receiving a security level for a keyboard based on a selection of a user;
   detecting key touches at the keyboard, wherein the keyboard comprises one or more first key areas and second key areas, wherein the one or more first key areas comprises respective subareas, wherein the one or more first key areas and each of the second key areas are marked with a respective indicia selected from a group consisting of a letter, a number, and a punctuation, wherein each of the subareas is not additionally marked, wherein a number of the subareas for the one or more first key areas depends on the security level in that the number of the subareas for the one or more first key areas is respectively increased for a higher security level, wherein each of the subareas of the keyboard is respectively associated with a unique code element, wherein in a first security keyboard configuration the one or more first key areas includes a specific number of subareas that is different than a specific number of subareas of each of the second key areas, and wherein in the first security keyboard configuration the second key areas remain undivided into subareas associated with unique code elements;
   encoding the detected key touches into an input code comprising some of the unique code elements;
   determining whether the input code matches a stored password code; and
   in response to determining that the input code matches the stored password code, authorizing access to a resource.

2. The method of claim 1, wherein the subareas of the one or more first key areas are of equal size.

3. The method of claim 1, further comprising dividing the one or more first key areas into the subareas by specifying two or more subregions of sensor pixels of a region of sensor pixels of a touch-sensitive screen.

4. The method of claim 1, wherein the determining whether the input code matches the stored password code includes transmitting the input code to a server remote from the device.

5. The method of claim 1, wherein in the first security keyboard configuration the specific number of subareas for the one or more first key areas is respectively two.

6. The method of claim 1, wherein in the first security keyboard configuration the one or more first key areas consists of a single first key area comprising a specific number of subareas greater than one and associated with the unique code elements.

7. A security device comprising:
   a keyboard comprising one or more first key areas and second key areas, wherein the one or more first key areas comprises respective subareas, wherein the one or more first key areas and each of the second key areas are marked with a respective indicia selected from a group consisting of a letter, a number, and a combination, wherein each of the subareas is not additionally marked, wherein each of the subareas of the keyboard is respectively associated with a unique code element, and wherein in a first security keyboard configuration the one or more first key areas includes a specific number of subareas that is different than a specific number of subareas of each of the second key areas;
   sensors operable to detect key touches that respectively contact subareas of the keyboard without contacting other subareas; and
   a first computer system comprising a first processor, a first computer-readable storage device, and program instructions stored on the first computer-readable storage device for execution by the first processor, wherein the first computer system is capable of:
      receiving a security level for a keyboard based on a selection of a user, wherein a number of the subareas for the one or more first key areas depends on the security level in that the number of the subareas for the one or more first key areas is respectively increased for a higher security level, and wherein in the first security keyboard configuration the second key areas remain undivided into subareas associated with unique code elements; and
      encoding the detected key touches into an input code comprising some of the unique code elements.

8. The security device of claim 7, wherein the subareas are rectangular.

9. The security device of claim 7, wherein the subareas are triangular.

10. The security device of claim 7, wherein the sensors are respectively selected from a group consisting of resistive sensors, capacitive sensors, and mechanical sensors.

11. The security device of claim 7, wherein the first computer system is further capable of determining whether the input code matches a stored password code.

12. The security device of claim 11, wherein the first computer system is further capable of authorizing access to a resource in response to determining that the input code matches the stored password code.

13. The security device of claim 7, wherein each of the unique code elements is respectively selected from a group consisting of a letter, a number, a character, and a combination.

14. The security device of claim 7, wherein the subareas are pie-shaped.

15. A computer program product for device security, the computer program product comprising:
a computer-readable storage medium having program instructions embodied therewith, the program instructions being executable by a computer to cause the computer to perform a method comprising:
receiving a security level for a keyboard based on a selection of a user;
detecting key touches at the keyboard, wherein the keyboard comprises one or more first key areas and second key areas, wherein the one or more first key areas comprises respective subareas, wherein the one or more first key areas and each of the second key areas are marked with a respective indicia selected from a group consisting of a letter, a number, and a punctuation, wherein each of the subareas is not additionally marked, wherein a number of the subareas for the one or more first key areas depends on the security level in that the number of the subareas for the one or more first key areas is respectively increased for a higher security level, wherein each of the subareas of the keyboard is respectively associated with a unique code element, wherein in a first security keyboard configuration the one or more first key areas includes a specific number of subareas that is different than a specific number of subareas of each of the second key areas, and wherein in the first security keyboard configuration the second key areas remain undivided into subareas associated with unique code elements;
encoding the detected key touches into an input code comprising some of the unique code elements;
determining whether the input code matches a stored password code; and
in response to determining that the input code matches the stored password code, authorizing access to a resource.

16. The computer program product of claim 15, wherein the one or more first key areas respectively include four subareas.

17. The computer program product of claim 15, wherein the method further comprises dividing the one or more first key areas into the subareas by specifying two or more subregions of sensor pixels of a region of sensor pixels of a touch-sensitive screen;
wherein the sensor pixels are resistive or capacitive sensor pixels.

18. The computer program product of claim 15, wherein the subareas of the one or more first key areas are of equal size.

19. The computer program product of claim 15, wherein the determining whether the input code matches the stored password code includes transmitting the input code to a server remote from the device.

20. The computer program product of claim 15, wherein in the first security keyboard configuration the specific number of subareas for the one or more first key areas is respectively two.

\* \* \* \* \*